United States Patent
Zhou

(10) Patent No.: US 10,326,984 B2
(45) Date of Patent: Jun. 18, 2019

(54) THREE-DIMENSIONAL IMAGE DISPLAY METHOD AND THREE-DIMENSIONAL IMAGE DISPLAY DEVICE

(71) Applicant: BOE TECHNOLOGY GROUP CO., LTD., Beijing (CN)

(72) Inventor: Chunmiao Zhou, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 551 days.

(21) Appl. No.: 14/770,908

(22) PCT Filed: Nov. 28, 2014

(86) PCT No.: PCT/CN2014/092505
§ 371 (c)(1),
(2) Date: Aug. 27, 2015

(87) PCT Pub. No.: WO2016/011757
PCT Pub. Date: Jan. 28, 2016

(65) Prior Publication Data
US 2016/0366400 A1    Dec. 15, 2016

(30) Foreign Application Priority Data
Jul. 24, 2014  (CN) .......................... 2014 1 0355656

(51) Int. Cl.
*G02B 27/22* (2018.01)
*H04N 13/356* (2018.01)
(Continued)

(52) U.S. Cl.
CPC ........... *H04N 13/356* (2018.05); *G02B 5/205* (2013.01); *G02B 27/2214* (2013.01);
(Continued)

(58) Field of Classification Search
CPC .................................................. G02B 27/2214
See application file for complete search history.

(56) References Cited

U.S. PATENT DOCUMENTS

2009/0015738 A1* 1/2009 Hong .................... G02B 27/225
349/15
2009/0015739 A1* 1/2009 Shin .................... G02B 27/2214
349/15
(Continued)

FOREIGN PATENT DOCUMENTS

CN    101344698 A    1/2009
CN    101888564 A    11/2010
(Continued)

OTHER PUBLICATIONS

First Chinese Office Action Appln. No. 201410355656.5; dated Feb. 26, 2016.
(Continued)

*Primary Examiner* — Rowina J Cattungal
(74) *Attorney, Agent, or Firm* — Ladas & Parry LLP; Loren K. Thompson

(57) ABSTRACT

A 3D image display method and a 3D image display device are provided. The 3D image display method comprises: receiving an image signal of an image to be displayed; for a predetermined disturbed pixel in a display panel corresponding to a liquid crystal phase disorder region between adjacent lens units in a plurality of lens units of a liquid crystal lens, converting the image signal into a 3D image signal for displaying a black image in the disturbed pixel; and sending the converted 3D image signal to the display panel for displaying. An pixel whose emitting light is directed to the liquid crystal phase disorder region of the liquid crystal lens is set to display a black image, which can remove the light directed to the liquid crystal phase disorder region of the liquid crystal lens, and then avoid the phe-
(Continued)

nomenon of crosstalk and distortion in a crosstalk region, thereby enlarging the entire viewing region of the 3D image.

6 Claims, 5 Drawing Sheets

(51) Int. Cl.
    *G02B 5/20*     (2006.01)
    *G09G 3/00*     (2006.01)
    *H04N 13/305*     (2018.01)
    *H04N 13/398*     (2018.01)

(52) U.S. Cl.
    CPC ........... *G09G 3/003* (2013.01); *H04N 13/305* (2018.05); *H04N 13/398* (2018.05); *G09G 2320/0209* (2013.01)

(56) References Cited

U.S. PATENT DOCUMENTS

| | | | |
|---|---|---|---|
| 2010/0103168 A1 | 4/2010 | Jung et al. | |
| 2010/0289884 A1 | 11/2010 | Kang | |
| 2011/0304783 A1 | 12/2011 | Park et al. | |
| 2012/0050261 A1* | 3/2012 | Feng | G02B 27/2242 345/419 |
| 2012/0287504 A1* | 11/2012 | Jang | H04N 13/0434 359/463 |
| 2013/0050284 A1 | 2/2013 | Sato | |

FOREIGN PATENT DOCUMENTS

| | | |
|---|---|---|
| CN | 102067615 A | 5/2011 |
| CN | 102279481 A | 12/2011 |
| CN | 102387375 A | 3/2012 |
| CN | 102917231 A | 2/2013 |
| CN | 102967941 A | 3/2013 |
| CN | 103071896 A | 5/2013 |
| CN | 103278993 A | 9/2013 |
| CN | 103558704 A | 2/2014 |
| CN | 104143308 A | 11/2014 |
| EP | 0744872 A2 | 11/1996 |

OTHER PUBLICATIONS

International Search Report & Written Opinion of the International Searching Authority Appln. No. PCT/CN2014/092505; dated May 5, 2015.

* cited by examiner

THREE-DIMENSIONAL IMAGE DISPLAY METHOD AND THREE-DIMENSIONAL IMAGE DISPLAY DEVICE

TECHNICAL FIELD

Embodiments of the present invention relate to a three-dimensional (3D) image display method and a 3D image display device.

BACKGROUND

At present, three-dimensional (3D) display technology has attracted much attention. A typical 3D display device comprises a display panel and a lenticular lens structure disposed at a light exiting side of the display panel, and the 3D display device utilizes the lenticular lens structure to create a plurality of viewing regions at the light exiting side of the display panel, such that light emitted from different sub-pixel units in the display panel enter different viewing regions, and left and right eyes of a viewer are positioned in different viewing regions, thus, the 3D display effect is obtained. With the development of 3D display technology, the lenticular lens structure is usually achieved by using liquid crystal, that is, a liquid crystal lens is usually used to achieve the 3D display.

A current liquid crystal lens, as illustrated in FIG. 1a, includes a first substrate 1 and a second substrate 2 opposed to each other, a liquid crystal layer 3 between the first substrate 1 and the second substrate 2, a first electrode 4 at a side of the first substrate 1 facing the liquid crystal layer 3, a first alignment layer 5 at a side of the first electrode 4 facing the liquid crystal layer 3, a second electrode 6 at a side of the second substrate 2 facing the liquid crystal layer 3, a second alignment layer 7 at a side of the second electrode 6 facing the liquid crystal layer 3, a first polarizer 9 at a side of the first substrate 1 facing away from the liquid crystal layer 3, and a second polarizer 10 at a side of the second substrate 2 facing away from the liquid crystal layer 3, wherein the first electrode 4 may be a strip-shaped electrode, and the second electrode 6 may be a plane-shaped electrode. The liquid crystal lens may be divided into a plurality of liquid crystal lens units, a plurality of first electrodes 4 are provided within each of the plurality of liquid crystal lens units, wherein FIG. 1a only shows one liquid crystal lens unit 8, and voltages applied to the first electrodes 4 within the one liquid crystal lens unit 8 are symmetric.

FIG. 1b shows a stereoscopic display principle of the current liquid crystal lens. As shown in FIG. 1b, liquid crystal molecules in the liquid crystal layer 3 are controlled to make different deflection degrees by applying different voltages to the first electrodes 4, to form a structure similar to a lens and split light exiting from a left-eye pixel and a right-eye pixel, thereby realizing 3D effect. However, during formation of the liquid crystal lens, as illustrated in FIG. 2a, because when different voltages are applied to the first electrodes 4 of the liquid crystal lens unit 8, a liquid crystal phase disorder region 003 is formed at an edge region of the lens unit 8 due to deviation of a lens structure 001 formed by liquid crystal relative to an ideal lens structure 002, the crosstalk occurs and the 3D image transmitted through the liquid crystal phase disorder region 003 may be distorted. FIG. 2b shows a crosstalk region 02 corresponding to the liquid crystal phase disorder region 003 of the liquid crystal lens, and a viewing region 01 of the 3D image is decreased because of the crosstalk region 02.

SUMMARY

Embodiments of the present invention provide a 3D image display method and a 3D image display device, capable of avoiding crosstalk and distortion in a crosstalk region and then enlarging the entire viewing region of the 3D image.

On the one hand, an embodiment of the present invention provides a 3D image display method comprising: receiving an image signal of an image to be displayed; for a predetermined disturbed pixel in a display panel corresponding to a liquid crystal phase disorder region between adjacent lens units in a plurality of lens units of a liquid crystal lens, converting the image signal into a 3D image signal for displaying a black image in the disturbed pixel; and sending the converted 3D image signal to the display panel for displaying.

On the other hand, an embodiment of the present invention provides a 3D image display device comprising: a display panel, configured to receive a 3D image signal and display an image; a signal receiving unit, configured to receive an image signal to be displayed; a 3D image converting unit, configured to, for a predetermined disturbed pixel in the display panel corresponding to a liquid crystal phase disorder region between adjacent lens units in a liquid crystal lens, convert the image signal into the 3D image signal for displaying a black image in the disturbed pixel; and a signal sending unit, configured to send the converted 3D image signal to the display panel for displaying.

BRIEF DESCRIPTION OF THE DRAWINGS

In order to illustrate the technical solution of the embodiments of the invention more clearly, the drawings of the embodiments will be briefly introduced below; it is obvious that the drawings as described below are only related to some embodiments of the invention, and are not construed as limiting of the present invention.

DETAILED DESCRIPTION

In order to make objects, technical details and advantages of the embodiments of the invention apparent, hereinafter, the technical solutions of the embodiments of the invention will be described in a clearly and fully understandable way in connection with the drawings related to the embodiments of the invention. It is obvious that the described embodiments are just a part but not all of the embodiments of the invention. Based on the described embodiments of the invention, those ordinarily skilled in the art can obtain other embodiment(s), without any inventive work, which should be within the scope sought for protection by the invention.

A 3D image display method and a 3D image display device provided by embodiments of the present invention will be illustrated in detail below with reference to the drawings.

The embodiments of the invention provide a 3D image display method, comprising the steps of:

S101: receiving an image signal of an image to be displayed;

S102: for a predetermined disturbed pixel in which crosstalk may occur in a display panel corresponding to a liquid crystal phase disorder region between adjacent lens units of a plurality of lens units in a liquid crystal lens, converting the image signal into a 3D image signal for displaying a black image in the disturbed pixel;

S103: sending the converted 3D image signal to the display panel for displaying.

Figure 1A:
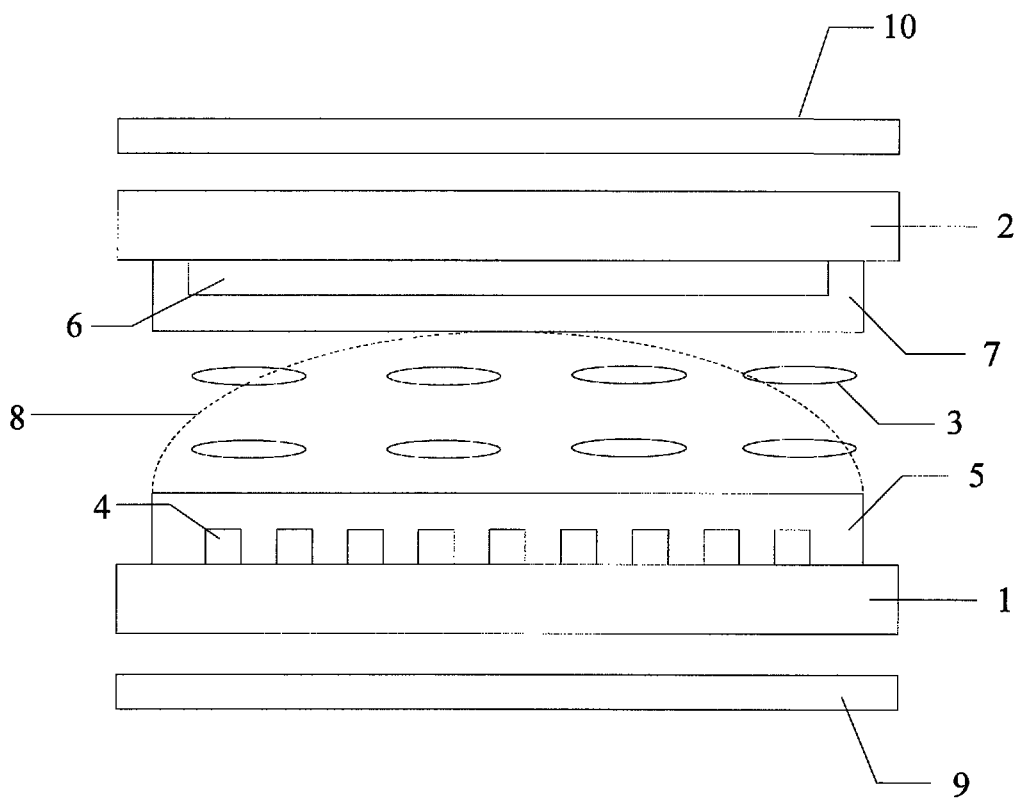
FIG. 1a is a cross-sectional structural view of a current liquid crystal lens.
Figure 1B:
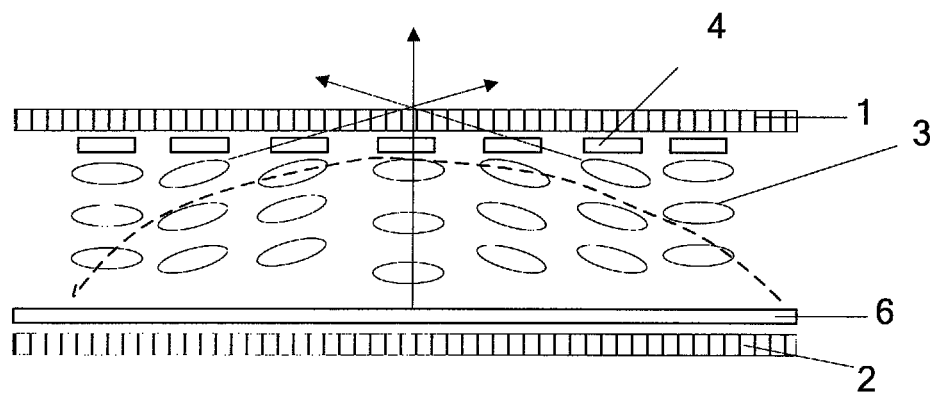
FIG. 1b is a forming principle view of the current liquid crystal lens.
Figure 2A:
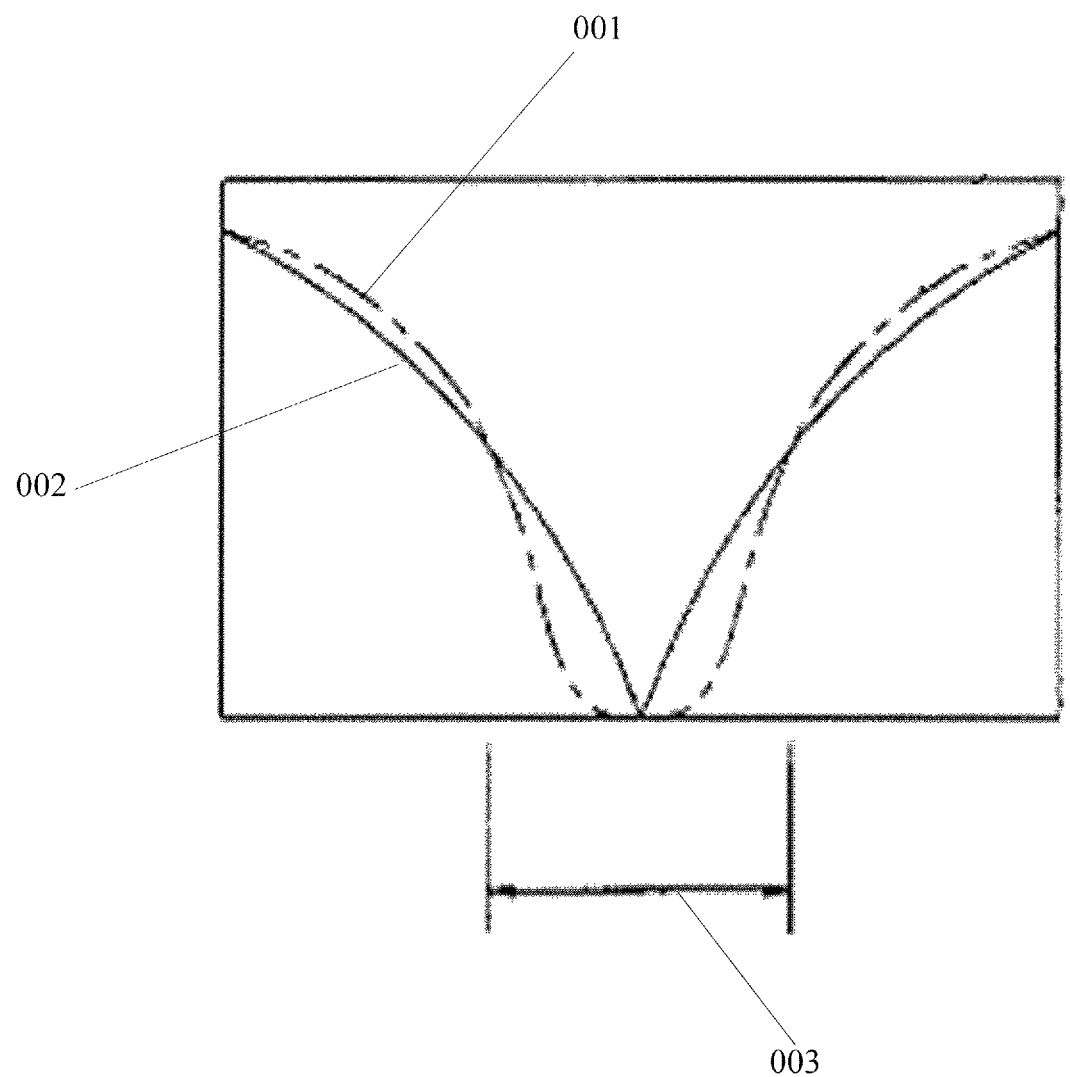
FIG. 2a shows a comparison view between a lens structure formed by the current liquid crystal lens unit and an ideal lens structure.
Figure 2B:
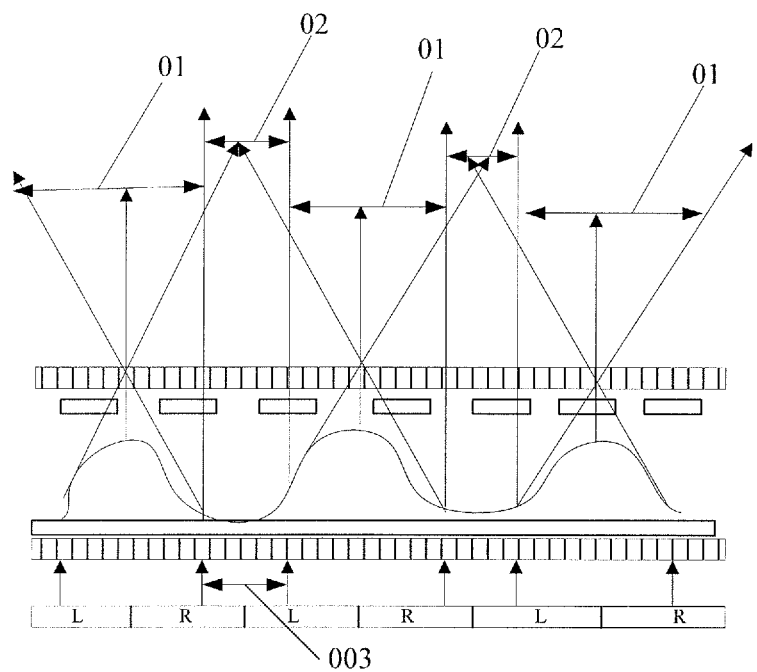
FIG. 2b shows a distribution view of a crosstalk region and a viewing region of a current 3D image display device.
Figure 3:
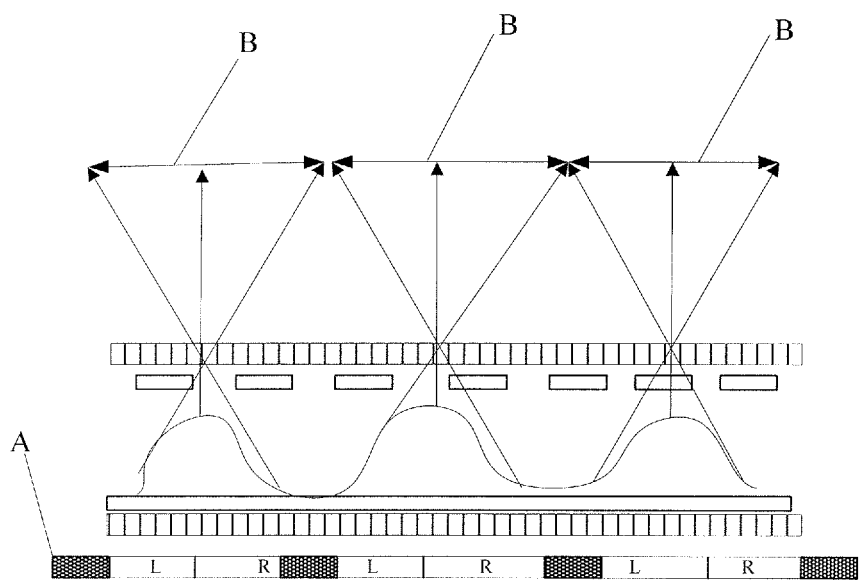
FIG. 3 shows a distribution view of a viewing region of a 3D image display device using an image display method according to an embodiment of the present invention.

In the 3D image display method provided by the embodiments of the present invention, after the image signal to be displayed is received, for the predetermined disturbed pixel in which crosstalk may occur in the display panel corresponding to the liquid crystal phase disorder region between adjacent lens units of the liquid crystal lens, the image signal is converted into a 3D image signal for displaying a black image in the corresponding disturbed pixel, and the converted 3D image signal is sent to the display panel for displaying, such that the disturbed pixel in the display panel displays the black image. In this case, an image whose emitting light is directed to the liquid crystal phase disorder region of the liquid crystal lens is set as the black image, thus, the light directed to the liquid crystal phase disorder region of the liquid crystal lens is eliminated. As shown in FIG. 3, A represents a corresponding disturbed pixel displaying the black image and B represents a viewing region. Thus, the phenomenon of crosstalk and distortion in a crosstalk region corresponding to the liquid crystal phase disorder region is avoided, and the entire viewing region of the 3D image is enlarged.

Exemplarily, in the above 3D image display method provided by an embodiment of the present invention, in the Step 102, the image signal is converted into the 3D image signal for creating the black image in the corresponding disturbed pixel in which crosstalk may occur, thus, an image corresponding to the liquid crystal phase disorder region of the liquid crystal lens is the black image, light directed to the liquid crystal phase disorder region of the liquid crystal lens can be removed to prevent crosstalk and distortion in the crosstalk region corresponding to the liquid crystal phase disorder region, thereby enlarging the entire viewing region of the 3D image.

Further, the above 3D image display method provided by an embodiment of the present invention may further comprises the following steps: determining the liquid crystal phase disorder region between adjacent lens units in the liquid crystal lens at the light exiting side of the display panel during switching from 2D display to 3D display; and determining a disturbed pixel in which crosstalk may occur in the display panel corresponding to the liquid crystal phase disorder region between adjacent lens units in the liquid crystal lens, according to the determined liquid crystal phase disorder region between adjacent lens units in the liquid crystal lens and a corresponding relation between the lens units and pixels in the display panel.

Exemplarily, to achieve crosstalk-free 3D image display of the liquid crystal lens, in the 3D image display method provided by an embodiment of the present invention, the liquid crystal phase disorder region between adjacent lens units in the liquid crystal lens is firstly determined, and then a position of a disturbed pixel in which crosstalk may occur in the display panel corresponding to the liquid crystal phase disorder region between adjacent lens units is determined according to the corresponding relation between the lens units and the pixels in the display panel, then, the corresponding disturbed pixel is made to display the black image, thus, an image whose emitting light is directed to the liquid crystal phase disorder region of the liquid crystal lens is set as a black image, the light directed to the liquid crystal phase disorder region of the liquid crystal lens is removed, so as to avoid the phenomenon of crosstalk and distortion in the crosstalk zone, thereby enlarging the entire viewing region of the 3D image.

Exemplarily, in the above 3D image display method provided by an embodiment of the present invention, during displaying the 3D image, it is necessary to apply different voltage signals to the strip-shaped electrodes in each of the lens units of the liquid crystal lens to control liquid crystal molecules to deflect in different extents, thereby forming the liquid crystal lens units, and compared with an ideal physical lens structure, the liquid crystal lens thus formed may deviate and form a phase deviation region. Therefore, determining the liquid crystal phase disorder region between adjacent lens units in the liquid crystal lens at the light exiting side of the display panel may achieved according to voltage signal applied to each of the strip-shaped electrodes in each of the lens units of the liquid crystal lens during the 3D image display.

Exemplarily, a region in which the strip-shaped electrode applied with the maximum voltage signal is positioned may be determined as the liquid crystal phase disorder region between the adjacent lens units, based on the voltage signal applied to each of the strip-shaped electrodes in each of the lens units of the liquid crystal lens during the 3D image display. In other words, a region where liquid crystal molecules are controlled by the strip-shaped electrode applied with the maximum voltage signal is the liquid crystal phase disorder region between adjacent liquid crystal lens units.

Figure 4A:
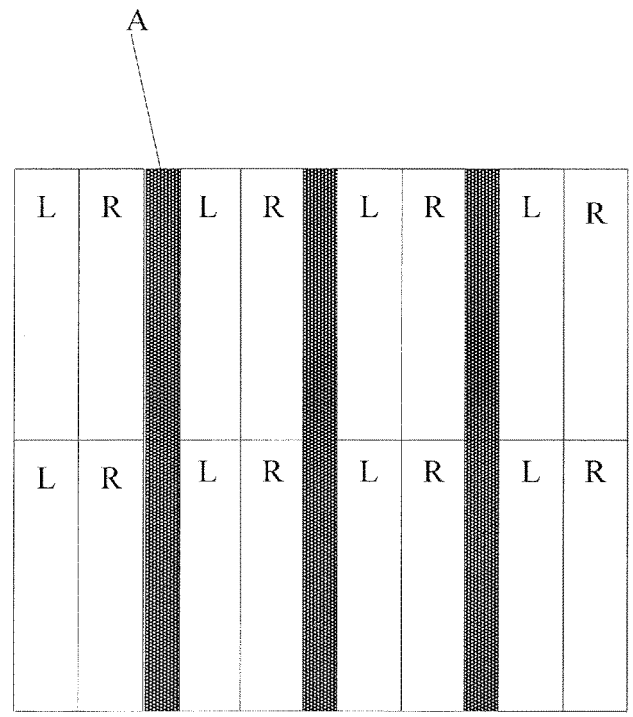
FIG. 4a shows an arranging view of pixels inserted with a black frame in a 2-viewpoint 3D image display device provided by an embodiment of the present invention.
Figure 4B:
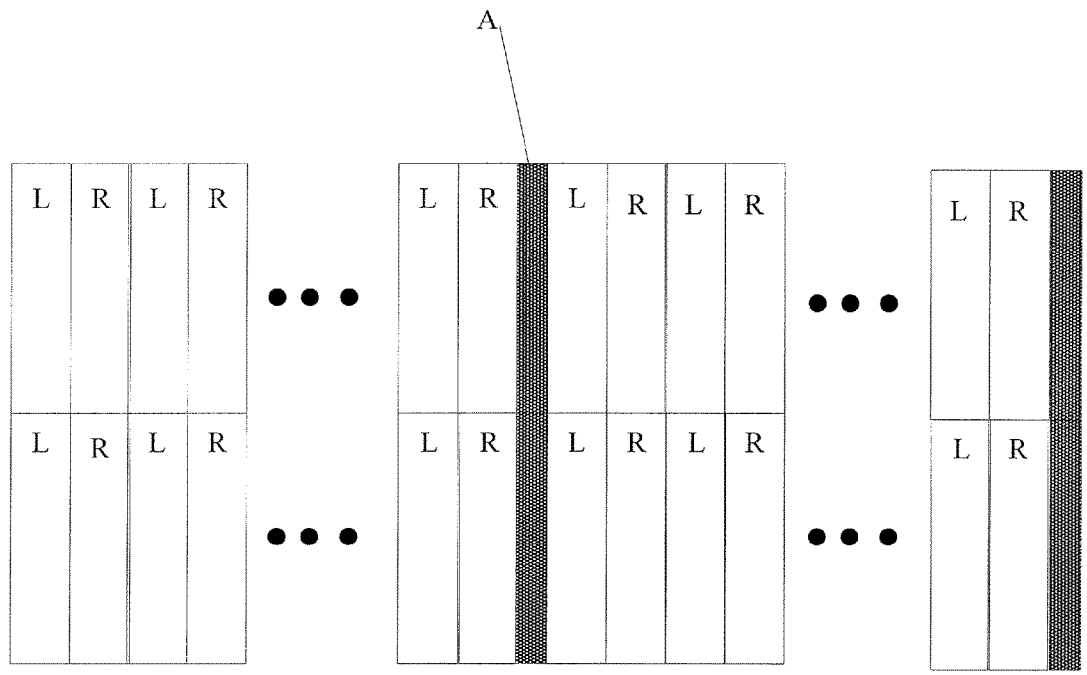
FIG. 4b shows an arranging view of pixels inserted with a black frame in a multi-viewpoint 3D image display device provided by an embodiment of the present invention.

Exemplarily, voltages applied to the strip-shaped electrodes of one liquid crystal lens unit may be 5V-3V-1V-0.2V-1V-3V-5V, wherein a region in which the strip-shaped electrode applied with voltage of 5V is positioned is a liquid crystal phase disorder region, and when a image signal to be displayed is subject to black frame insertion treatment, the image signal of a disturbed pixel A in which crosstalk may occur in the display panel corresponding to the liquid crystal phase disorder region is set as a back frame image signal, such as a 2-viewpoint display shown in FIG. 4a and a multi-viewpoint display shown in FIG. 4b. In this way, the image whose emitting light is directed to the liquid crystal phase disorder region between the liquid crystal lens units is set as the black frame image, which may remove light directed to the liquid crystal phase disorder region of the liquid crystal lens to prevent the phenomenon of crosstalk and distortion in the crosstalk region, thereby enlarging the entire viewing region of the 3D image.

Based on the same inventive concept, an embodiment of the present invention further provides a 3D image display device, the principle for solving the problem of the device is similar to that of the 3D image display method above-mentioned, so the application of which can refer to the above 3D image display method and will not be repeatedly illustrated herein.

Figure 5:
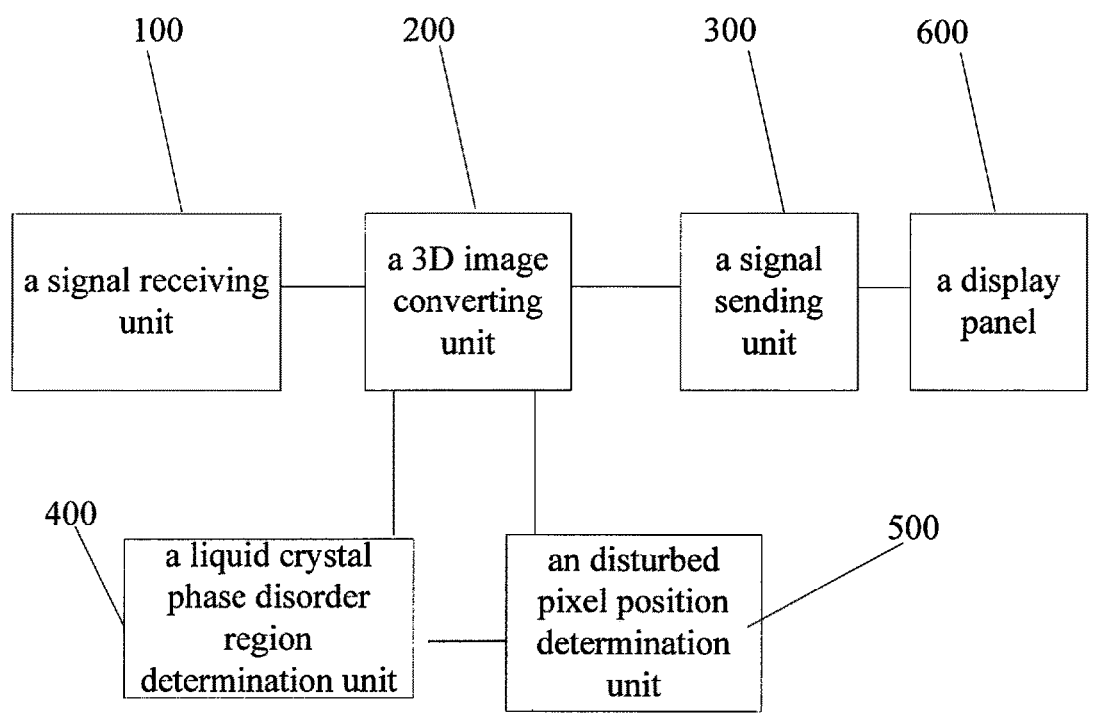
FIG. 5 is a structural block view of a 3D image display device provided by an embodiment of the present invention.

Exemplarily, the 3D image display device provided by the embodiment of the present invention, as shown in FIG. 5, comprises:

a display panel 600, receiving a 3D image signal and displaying an image;

a signal receiving unit 100, configured to receive an image signal to be displayed;

a 3D image converting unit 200, configured to convert the image signal to be displayed into the 3D image signal for displaying a black image in a disturbed pixel in which crosstalk may occur, according to the predetermined disturbed pixel in which crosstalk may occur in the display panel corresponding to a liquid crystal phase disorder region between adjacent lens units of a liquid crystal lens; and a signal sending unit 300, configured to send the converted 3D image signal to the display panel for displaying.

Exemplarily, in the 3D image display device provided by the embodiments of the present invention, the 3D image converting unit 200 is configured to convert the image signal into the 3D image signal for displaying the black image in the disturbed pixel.

Exemplarily, the 3D image display device provided by the embodiments of the present invention further comprises:

a liquid crystal phase disorder region determination unit 400, configured to determine the liquid crystal phase disorder region between adjacent lens units in the liquid crystal lens at a light exiting side of the display panel when 2D image display is switched to 3D image display; and an disturbed pixel position determination unit 500, determining the disturbed pixel in the display panel corresponding to the liquid crystal phase disorder region between adjacent lens units in the liquid crystal lens, according to the determined liquid crystal phase disorder region between adjacent lens units in the liquid crystal and a corresponding relation between the lens units and pixels in the display panel.

Exemplarily, in the above 3D image display device provided by an embodiment of the present invention, the liquid crystal phase disorder region determination unit 400 is configured to determine the liquid crystal phase disorder region between adjacent lens units, according to the voltage signal applied to each of the strip-shaped electrodes of each of the lens units in the liquid crystal lens during 3D image display.

Exemplarily, in the above 3D image display device provided by an embodiment of the present invention, the liquid crystal phase disorder region determination unit 400 is configured to determine a region corresponding to the strip-shaped electrode applied with the maximum voltage signal as the liquid crystal phase disorder region between adjacent lens units, according to the voltage signal applied to each of the strip-shaped electrodes of each of the lens units in the liquid crystal lens during 3D image display.

Those skilled in the art, from the illustration of the above embodiments, may know that the embodiments of the invention may be carried out by hardware or by means of software together with necessary universal hardware platform. In view of this understanding, the technical solution of the embodiments of the present invention may be embodied in the form of a software product which may be stored in a non-volatile memory medium (e.g. a CD-RIM, U-disk, portable hard disk and the like), comprising a plurality of instructions to enable a computer (which may be a personal computer, a server or an Internet device and so on) to carry out the method in each of the embodiments of the invention.

Those skilled in the art may understand that the drawings are only schematic views of the exemplary embodiments, and the modules or procedures in the drawings may not be necessary for carrying out the embodiments of the invention.

Those skilled in the art may understand that the modules in the device of the embodiments may be distributed therein according to the illustration of the embodiments, or may be modified correspondingly such that they may be positioned in one or more devices which is different from that of the embodiments. The modules in the embodiments may be combined into one module or may be divided into more sub-modules.

The numbers of the embodiments are only intended for illustration but do not mean superior or inferior of the embodiments.

With the 3D image display method and the 3D image display device provided by the embodiments of the present invention, after an image signal to be displayed is received, the image signal is convert into a 3D image signal for displaying a black image in a disturbed pixel in which crosstalk may occur, for the predetermined disturbed pixel in which crosstalk may occur in the display panel corresponding to a liquid crystal phase disorder region between adjacent lens units of the liquid crystal lens; and then the converted 3D image signal is send to a display panel for displaying, such that the disturbed pixel in the display panel displays the black image, thus, an image whose emitting light is directed to the liquid crystal phase disorder region of the liquid crystal lens is set as a black image to remove the light directed to the liquid crystal phase disorder region of the liquid crystal lens, thereby avoiding the phenomenon of crosstalk and distortion in a crosstalk zone, thereby enlarging the entire viewing region of the 3D image.

It is apparent that various modification and variants can be made to the embodiments of the present invention without departing from the spirit and scope of the invention. Such modifications and variants, if within the scope of the claims and equivalent technologies, are intended to be encompassed within the present invention.

The present application claims priority of Chinese Patent Application No. 201410355656.5 filed on Jul. 24, 2014, the disclosure of which is incorporated herein by reference in its entirety as part of the present application.

The invention claimed is:

1. A 3D image display method, comprising:
receiving an image signal of an image to be displayed;
for a predetermined disturbed pixel in a display panel corresponding to a liquid crystal phase disorder region between adjacent lens units in a plurality of lens units of a liquid crystal lens, converting the image signal into a 3D image signal for displaying a black image in the predetermined disturbed pixel corresponding to the liquid crystal phase disorder region between adjacent lens units in the plurality of lens units of the liquid crystal lens; and
sending the converted 3D image signal to the display panel for displaying,
wherein the 3D image display method further comprises:
determining the liquid crystal phase disorder region between adjacent lens units in the liquid crystal lens at a light exiting side of the display panel during switching from 2D display to 3D display; and
determining the disturbed pixel in the display panel corresponding to the liquid crystal phase disorder region between adjacent lens units in the liquid crystal lens, according to the determined liquid crystal phase disorder region between adjacent lens units in the liquid crystal lens and a corresponding relation between the lens units and pixels in the display panel, wherein the disturbed pixel is applied with a black frame image signal, wherein the disturbed pixel in the display panel corresponding to the liquid crystal phase disorder region between adjacent lens units in a plurality of lens units of the liquid crystal lens does not emit light or does not transmit light.

2. The 3D image display method according to claim 1, wherein the determining the liquid crystal phase disorder region between adjacent lens units in the liquid crystal lens at the light exiting side of the display panel comprises:

determining the liquid crystal phase disorder region between the adjacent lens units according to a voltage signal applied to each of strip-shaped electrodes in each of the lens units of the liquid crystal lens during the 3D display.

3. The 3D image display method according to claim 2, wherein the determining the liquid crystal phase disorder region between the adjacent lens units according to the voltage signal applied to each of the strip-shaped electrodes in each of the lens units of the liquid crystal lens during the 3D display comprises:

determining a region in which the strip-shaped electrode applied with a maximum voltage signal is positioned as the liquid crystal phase disorder region between adjacent lens units, according to the voltage signal applied to each of the strip-shaped electrodes in each of the lens units of the liquid crystal lens during the 3D display.

4. A 3D image display device, comprising:
a display panel, configured to receive a 3D image signal and display an image;
a signal receiving unit, configured to receive an image signal to be displayed;
a 3D image converting unit, configured to, for a predetermined disturbed pixel in the display panel corresponding to a liquid crystal phase disorder region between adjacent lens units in a liquid crystal lens, convert the image signal into the 3D image signal for displaying a black image in the predetermined disturbed pixel corresponding to the liquid crystal phase disorder region between adjacent lens units in the plurality of lens units of the liquid crystal lens; and
a signal sending unit, configured to send the converted 3D image signal to the display panel for displaying, wherein the 3D image display device further comprises:
a liquid crystal phase disorder region determination unit, configured to determine the liquid crystal phase disorder region between adjacent lens units in the liquid crystal lens at a light exiting side of the display panel when 2D image display is switched to 3D image display; and a disturbed pixel position determination unit, configured to determine the disturbed pixel in the display panel corresponding to the liquid crystal phase disorder region between adjacent lens units in the liquid crystal lens, according to the determined liquid crystal phase disorder region between adjacent lens units in the liquid crystal and a corresponding relation between the lens units and pixels in the display panel, wherein the disturbed pixel is applied with a black frame image signal, wherein the disturbed pixel in the display panel corresponding to the liquid crystal phase disorder region between adjacent lens units in a plurality of lens units of the liquid crystal lens does not emit light or does not transmit light.

5. The 3D image display device according to claim 4, wherein the liquid crystal phase disorder region determination unit is configured to determine the liquid crystal phase disorder region between adjacent lens units, according to voltage signal sent to each of strip-shaped electrodes in each of the lens unit in the liquid crystal lens during the 3D image display.

6. The 3D image display device according to claim 5, wherein the liquid crystal phase disorder region determination unit is configured to determine a region in which the strip-shaped electrode applied with a maximum voltage signal is positioned as the liquid crystal phase disorder region between adjacent lens units.

* * * * *